(12) United States Patent
Ormsbee

(10) Patent No.: US 12,703,067 B2
(45) Date of Patent: Aug. 11, 2026

(54) SYSTEMS AND METHODS FOR A RATCHET MULTITOOL DEVICE

(71) Applicant: Nite Ize, Inc., Boulder, CO (US)

(72) Inventor: Bowden Ormsbee, Longmont, CO (US)

(73) Assignee: Nite Ize, Inc., Boulder, CO (US)

( * ) Notice: Subject to any disclaimer, the term of this patent is extended or adjusted under 35 U.S.C. 154(b) by 65 days.

(21) Appl. No.: 17/342,184

(22) Filed: Jun. 8, 2021

(65) Prior Publication Data

US 2022/0388130 A1 Dec. 8, 2022

(51) Int. Cl.

| | |
|---|---|
| ***B25B 15/04*** | (2006.01) |
| ***B25B 13/02*** | (2006.01) |
| ***B25B 23/00*** | (2006.01) |
| ***B25G 1/08*** | (2006.01) |
| ***B26B 11/00*** | (2006.01) |
| ***B67B 7/16*** | (2006.01) |
| ***F16B 45/02*** | (2006.01) |

(52) U.S. Cl.

CPC .............. *B25B 15/04* (2013.01); *B25B 13/02* (2013.01); *B25B 23/0035* (2013.01); *B25G 1/085* (2013.01); *B26B 11/00* (2013.01); *B67B 7/16* (2013.01); *F16B 45/02* (2013.01)

(58) Field of Classification Search

CPC ..... B25B 15/04; B25B 13/02; B25B 23/0035; B25G 1/085; B26B 11/00; B67B 7/16; F16B 45/02

USPC ............................................ 7/138, 165, 169

See application file for complete search history.

(56) References Cited

U.S. PATENT DOCUMENTS 5,685,206 A * 11/1997 Ma .......................... B25F 1/003 81/437
5,970,553 A * 10/1999 Lin ......................... B25B 13/16 7/168
6,082,232 A * 7/2000 Anderson .............. B25G 1/085 81/439
6,085,620 A * 7/2000 Anderson ............... B25F 1/003 81/439
6,109,148 A * 8/2000 Anderson ................. B25F 1/02 7/168
6,305,254 B1 * 10/2001 Hsieh ..................... B25G 1/063 81/177.4
6,640,675 B1 * 11/2003 Chuang ..................... B25F 1/04 81/177.4
6,739,224 B1 * 5/2004 Wershe .................. B25G 1/085 81/177.4

(Continued)

OTHER PUBLICATIONS

International Search Report and Written Opinion dated Aug. 30, 2022 issued in related PCT App. No. PCT/US2022/072740 (8 pages).

(Continued)

*Primary Examiner* — Brian D Keller
*Assistant Examiner* — Jason Khalil Hawkins
(74) *Attorney, Agent, or Firm* — Haynes and Boone, LLP

(57) ABSTRACT

A ratchet keychain attachment includes a body and a ratcheting area in the body. The ratchet keychain attachment further includes a bit holder, the bit holder pivotally mounted in the body. The ratchet keychain attachment further includes a bit, removably located in the bit holder, the bit holder having a first position where the bit is held in a non-removable position in the bit holder and a second position where the bit is in a removable position.

18 Claims, 10 Drawing Sheets

(56) References Cited

U.S. PATENT DOCUMENTS

| | | | | |
|---|---|---|---|---|
| 6,916,106 | B2 * | 7/2005 | Xingguo | B25G 1/043 362/120 |
| 7,424,837 | B2 * | 9/2008 | Shu | B25G 1/085 81/177.4 |
| 7,434,688 | B2 * | 10/2008 | Hu | B25H 3/023 206/379 |
| 7,712,399 | B2 * | 5/2010 | Nenadic | B26B 11/003 7/128 |
| 8,087,115 | B2 * | 1/2012 | Barber | B25G 1/085 7/161 |
| 8,316,492 | B2 * | 11/2012 | Barber | B26B 11/008 7/118 |
| 9,669,532 | B1 | 6/2017 | Mayer | |
| 9,840,001 | B2 * | 12/2017 | Neubauer | B25B 15/02 |
| 10,611,012 | B2 | 4/2020 | Adelman et al. | |
| 2002/0005095 | A1 * | 1/2002 | Anderson | B25F 1/003 81/440 |
| 2002/0069729 | A1 * | 6/2002 | Anderson | B25F 1/02 81/440 |
| 2008/0178717 | A1 * | 7/2008 | Shu | B25B 13/468 81/60 |
| 2010/0243496 | A1 * | 9/2010 | Chen | B25H 3/003 206/373 |
| 2016/0176035 | A1 | 6/2016 | Heise | |
| 2018/0235321 | A1 * | 8/2018 | Chang | B25B 13/04 |
| 2020/0307003 | A1 * | 10/2020 | Berman | B25F 1/02 |

OTHER PUBLICATIONS

Nitelze, “Nitelze Introduces Everyday Carry Tool with Built-In Ratchet” [online], Aug. 2, 2021; pp. 1-2; [retrieved on Jul. 26, 2021], retrieved from the internet: url:http://niteize.com/nite-ize-introduces-everyday-carry-tool-with-built-in-ratchet; pp. 1-2.

* cited by examiner

SYSTEMS AND METHODS FOR A RATCHET MULTITOOL DEVICE

BACKGROUND

In numerous scenarios it is desirable to have various tools for a user, without having to account for and carry such tools. Numerous small tools exist for consumers including Swiss army knives and multi-tools. One disadvantage of such devices is that the user must carry the device in addition to a wallet, smart phone, keys, or other items commonly held in one's pockets. Additionally, a consumer may forget to put such a device in their pocket and therefore be deprived of the device when in need. Finally, even compact multitools tend to have few moving pieces and provide solely for a fixed, typically metal printed apparatus.

BRIEF SUMMARY

In one embodiment, a ratchet keychain attachment includes a body and a ratcheting area in the body. The ratchet keychain attachment further includes a bit holder, the bit holder pivotally mounted in the body. The ratchet keychain attachment further includes a bit, removably located in the bit holder, the bit holder having a first position where the bit is held in a non-removable position in the bit holder and a second position where the bit is in a removable position. In one alternative, the ratcheting area includes a bit receiving area, the bit receiving area shaped to receive and hold the bit in an operable position. In another alternative, the body includes a first aperture, the bit holder located in the first aperture, an edge of the body defining the first aperture preventing the bit from being removed from the bit holder when the bit holder is in the first position. Alternatively, the bit holder includes a bit holder body that has a second aperture for receiving the bit. In another alternative, the second aperture has a sleeve shape. Alternatively, when the bit holder is in the second position, the bit can be slid in and out of the sleeve shape. In another alternative, when the bit holder is in the first position, the edge of the body prevents the bit from being slid in and out of the sleeve shape. Alternatively, the body includes a carabiner portion. In another alternative, the body further includes a bottle opener, a cutting area, and a wrench area. Alternatively, the ratchet area is located at a first end of a longer length of the body. In another alternative, the carabiner portion is located at a second end of the longer length of the body. Alternatively, the body is the within 200% the size of a standard key. In another alternative, wherein the bit receiving area only ratchets in one rotational direction. Alternatively, the bit receiving area includes a first side and a second side and the bit receiving area receives the bit on either of the first side and the second side. In another alternative, the bit holder is held in the first position via an interference fit with the edge of the body. Alternatively, the interference fit occurs due to a shape of the bit holder and the first aperture.

In one embodiment, a ratchet carabiner includes a body and a bit holder, the bit holder pivotally mounted in the body. The ratchet carabiner further includes a bit, removably located in the bit holder, the bit holder having a first position where the bit is held in a non-removable position in the bit holder and a second position where the bit is in a removable position. Alternatively, there is a ratcheting area in the body. In one alternative, the ratcheting area includes a bit receiving area, the bit receiving area shaped to receive and hold the bit in an operable position and includes a first aperture, the bit holder located in the first aperture, an edge of the body defining the first aperture preventing the bit from being removed from the bit holder when the bit holder is in the first position.

In one embodiment, a method of using a ratchet carabiner includes providing a ratchet carabiner. The ratchet keychain attachment includes a body and a ratcheting area in the body. The ratchet keychain attachment further includes a bit holder, the bit holder pivotally mounted in the body. The ratchet keychain attachment further includes a bit, removably located in the bit holder, the bit holder having a first position where the bit is held in a non-removable position in the bit holder and a second position where the bit is in a removable position. The method further includes rotating the bit holder to the second position. The method further includes removing the bit and inserting the bit in the ratcheting area. The method further includes ratcheting with the ratcheting carabiner. In one alternative, the ratcheting carabiner includes a carabiner section on the body, and the method further includes removing the ratcheting carabiner from a key chain via the carabiner section.

DETAILED DESCRIPTION

Certain terminology is used herein for convenience only and is not to be taken as a limitation on the embodiments of the systems and methods for ratchet multitool device (Ratchet Multitool). In many embodiments, the Ratchet Multitool (or Ratcheting Carabiner or Ratchet Keychain Attachment) includes a carabiner for easy attachment to a key ring or other location, however, in alternatives, this may be another attachment mechanism. In many embodiments, the Ratchet Multitool includes a bottle opener portion. In many embodiments, the multitool may include a printed, stepped, wrench portion. In many embodiments, the Ratchet Multitool includes a sharpened end that can be used as a box cutter or other cutting implement. In many embodiments, the Ratchet Multitool includes a flat head screw driver associated with the sharpened end. In many embodiments, the Ratchet Multitool includes a central screwdriver bit storage area. In many embodiments, the storage area rotates from a closed to an open position. In many embodiments, the Ratchet Multitool includes a ratchet area. The ratchet area is oriented to receive a bit from the central screw driver bit storage area. In many embodiments, the ratchet area ratchets in only one direction. In many embodiments, the ratchet area may receive a screw driver bit from either side of the device, making the ratcheting action operable from either side. In alternatives, items other than a screw driver bit may be included as a bit. Alternatives, may include or exclude one or more of the above listed parts.

Figure 1:
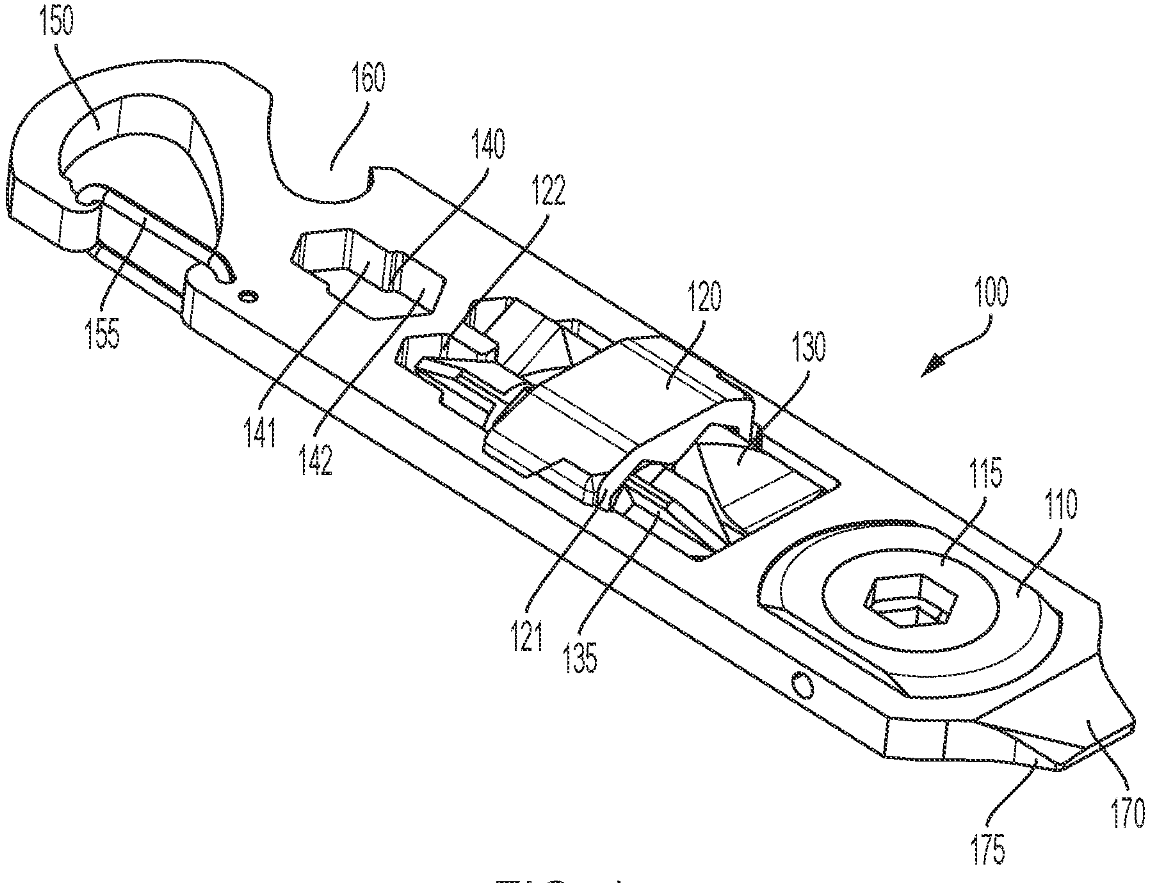
FIG. 1 shows one embodiment a ratcheting multitool.

FIG. 1 shows one embodiment of a Ratchet Multitool 100. Ratchet Multitool 100 includes ratchet 110. Ratchet 110, in many configurations, is a device consisting of a bar or wheel with a set of angled teeth in which a cog or tooth engages, allowing motion in one direction only. Alternative formations of a ratchet for ratchet 110 are available in alternative configurations. The interior portion 115 of ratchet 115 only allows for rotation in one direction. In the center of the body of Ratchet Multitool 100, a bit storage area 120 or tool holder is included. Bit storage area 120 (or tool holder or bit holder) is shaped to receive a first and second screw driver bit 130, 135. The body of the Ratchet Multitool 100 includes an aperture 122 shaped to receive and hold the bit storage area 120. The bit storage area 120 includes a rotating mechanism, which in many embodiments may rotate in and out to provide for the access and storage of bits. Additionally, Ratchet Multitool 100 includes stepped wrench area 140 which includes two cutouts 141, 142 of different sizes for receiving bolts. Ratchet Multitool 100 further includes a carabiner section 150 including a gate 155 providing for ready attachment to a variety objects. Additionally, Ratchet Multitool 100 includes a bottle opener section 160. The Ratchet Multitool includes a flat head screw driver 170 associated with the sharpened end 175.

Figure 2:
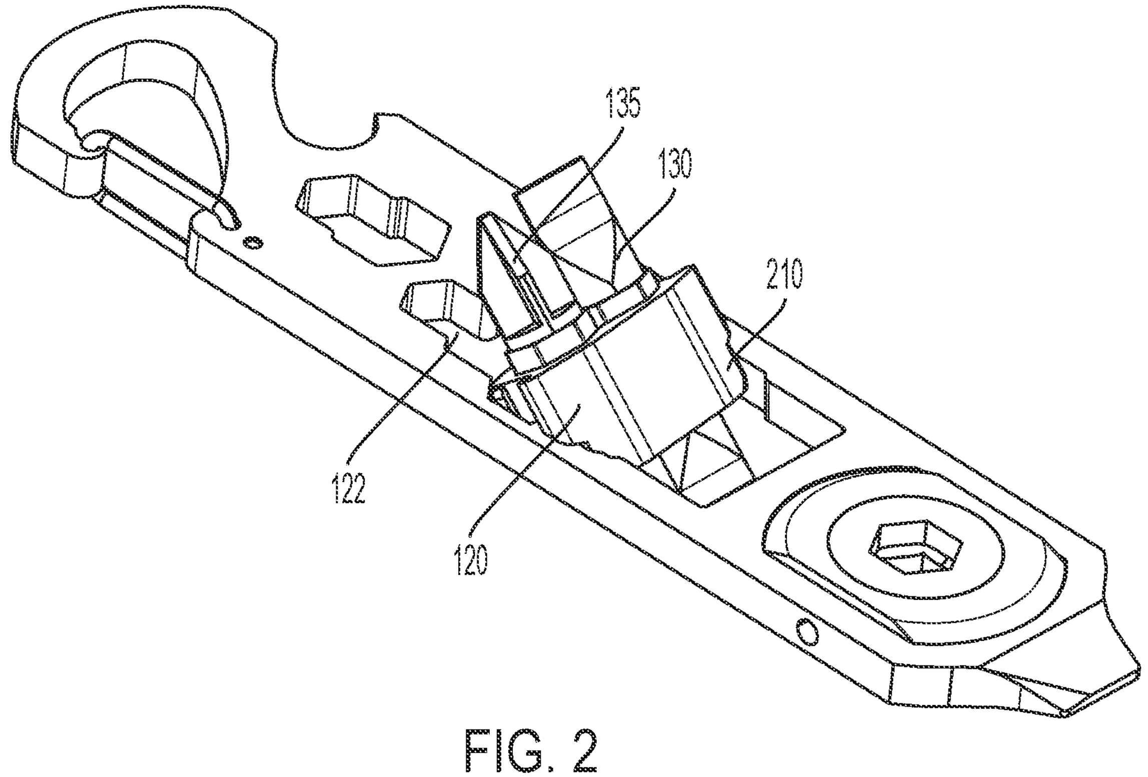
FIG. 2 shows the ratcheting multitool of FIG. 1 with the bit holder rotated.

FIG. 2 shows the rotation of bit storage area 120 out of aperture 122 to provide for access to the bits, 130, 135. In some embodiments, the width of area 210 of bit storage area 120 may be slightly wider than the space in aperture 122. In this arrangement, the system includes an interference fit based in the width of area 210 and the space in aperture 122. In such an arrangement, the two press against each other, effectively holding the bit storage area 120 in place. This interference or friction may be overcome by the leverage provided by pressing on bit 130, 135, allowing the bit storage area 120 to rotate. Additionally, in other configurations, the bit holder body 12 (second aperture) of bit storage area may have a shape that resists opening via an interference fit. In such a case, a squared off bit holder body 121 may interfere with or find resistance against a similarly cut shape as it rotates. This can be seen in aperture 122 as compared to the shape of bit storage area 120. Bit storage area 120 includes a wider portion and a narrower portion and a diagonal interface between the two. In many configurations, it is along this diagonal interface that the interference that holds the bit storage area 120 in place may occur. If this diagonal interface between the two sections were abrupt and squared, it is thought that the interference force experienced when turning the bit storage area 120 would be increased. This diagonal nature allows for some interference force, but a reduced force compared to a squared off arrangement.

Figure 3:
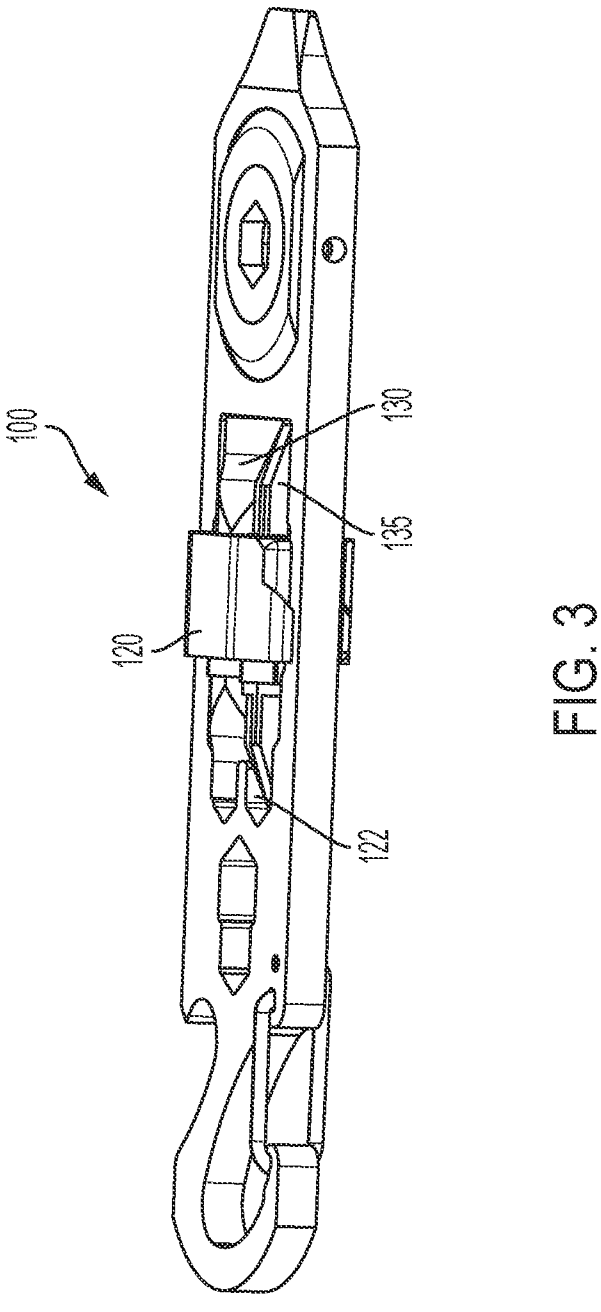
FIG. 3 shows a side view of the ratcheting multitool of FIG. 1.

FIG. 3 shows an alternative view of Ratchet Multitool 100. In this view the low profile maintained by the tool can be appreciated. This may be an important feature for users as if the device is to be used a key chain, size and thickness may be important.

Figure 4:
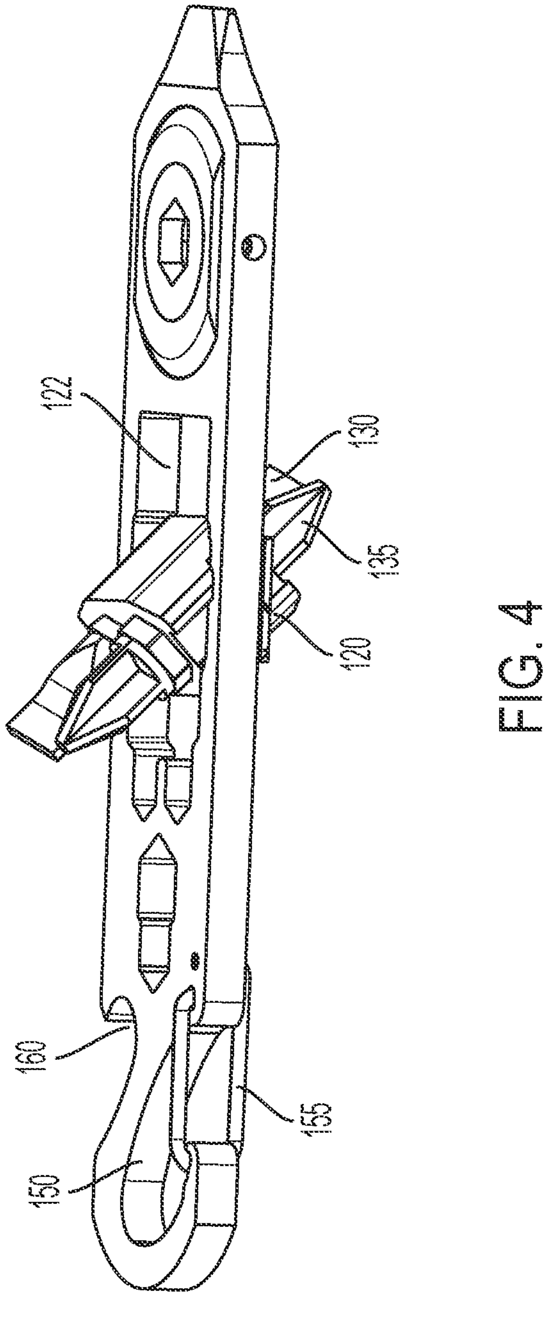
FIG. 4 shows a side view of the ratcheting multitool of FIG. 1 with the bit holder rotated.

FIG. 4 shows the same view as FIG. 3 with the bit storage area rotated.

Figure 5:
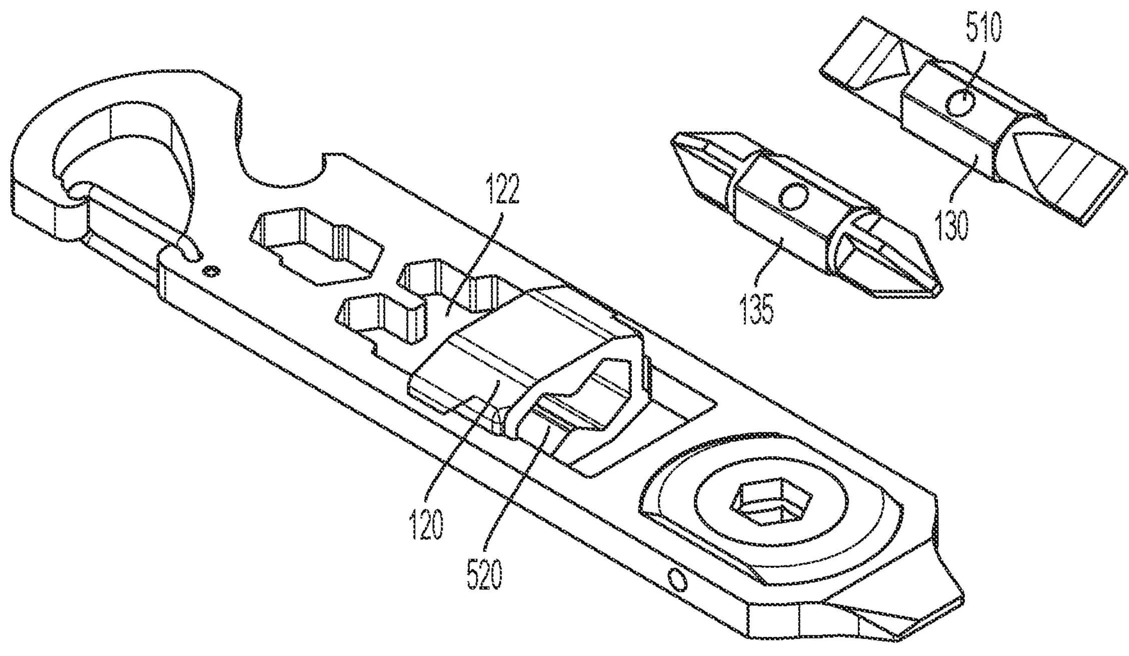
FIG. 5 shows the ratcheting multitool of FIG. 1 with the bits removed.
Figure 6:
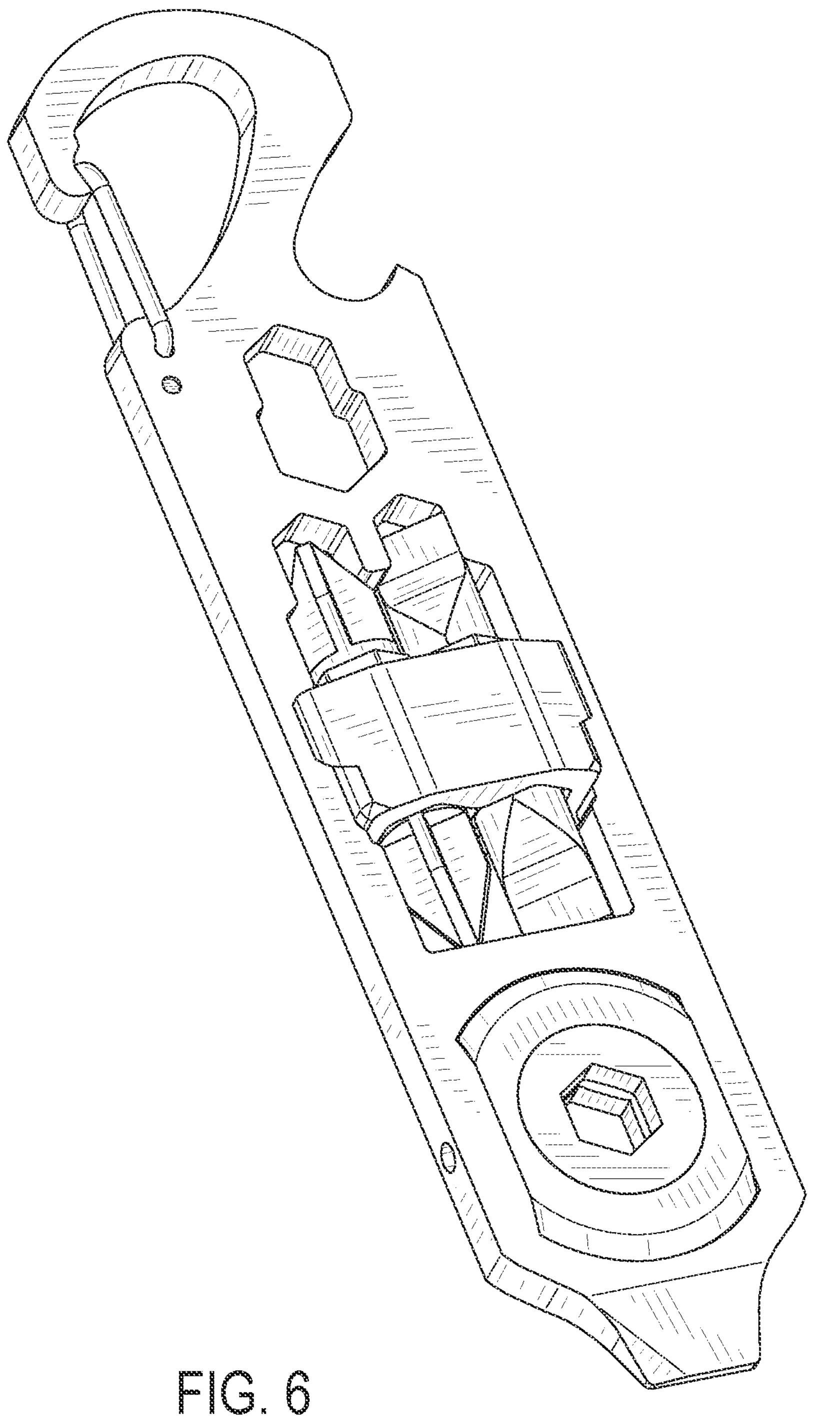
FIG. 6 shows a perspective view of an embodiment of a ratcheting multitool.
Figure 7:
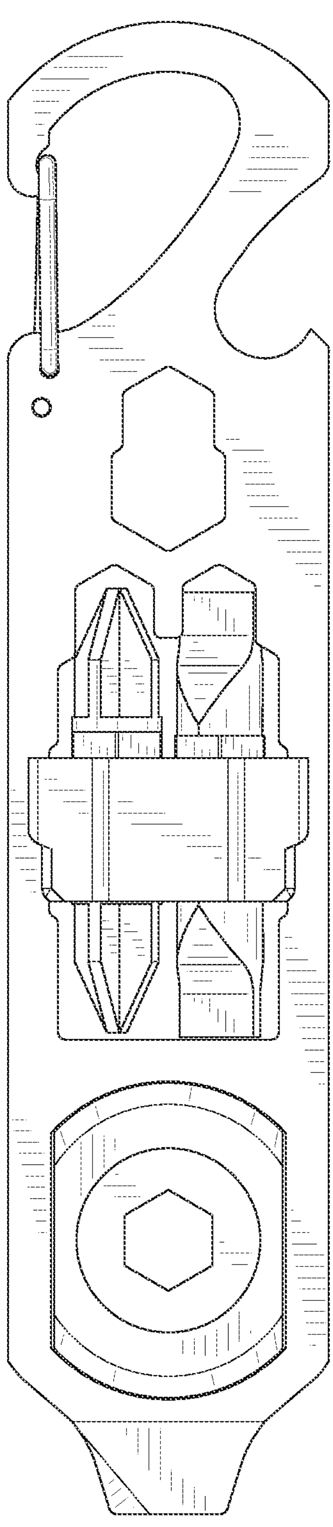
FIG. 7 shows a left side view of the ratcheting multitool of FIG. 6.
Figure 8:
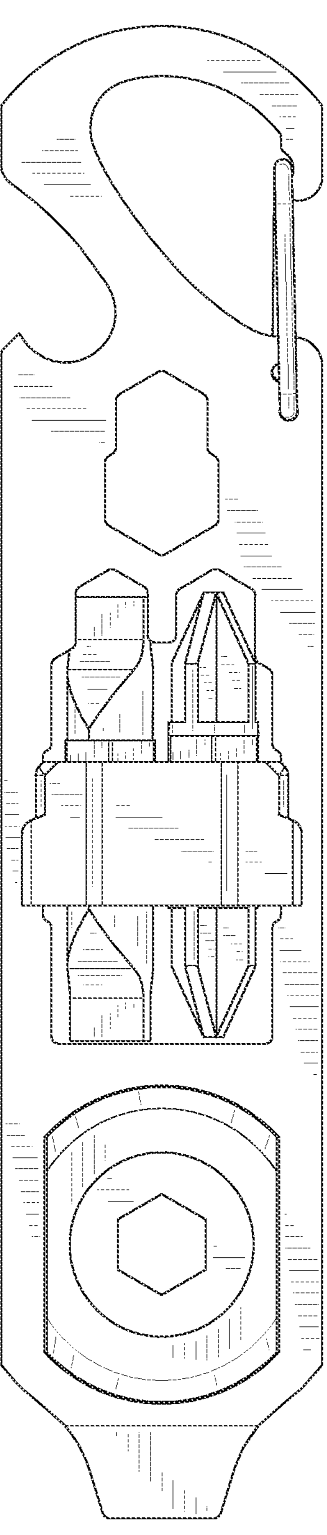
FIG. 8 shows a right side view of the ratcheting multitool of FIG. 6.
Figures 9, 10:
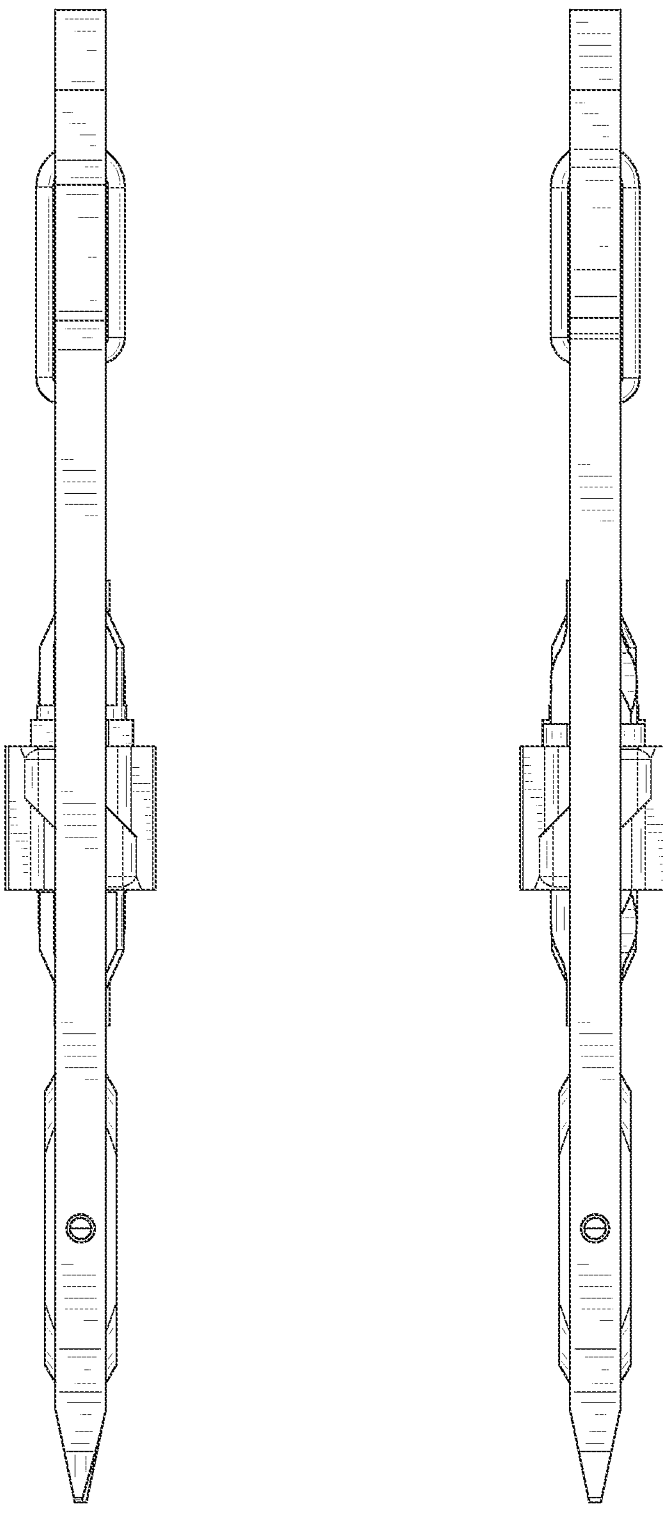
FIG. 9 shows a top view of the ratcheting multitool of FIG. 6.
FIG. 10 shows a bottom view of the ratcheting multitool of FIG. 6.
Figure 11:
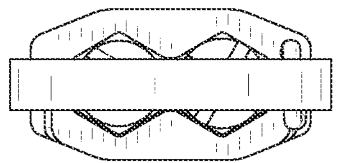
FIG. 11 shows a front view of the ratcheting multitool of FIG. 6.
Figure 12:
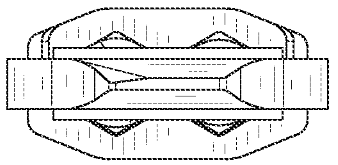
FIG. 12 shows a back view of the ratcheting multitool of FIG. 6.

FIG. 5 shows another view of Ratchet Multitool 100 with bits 130, 135 removed. In this view, it is shown that bits 130, 135 may include depression 510. Depression 510 may mate with a protrusion in the void 520 (sleeve shape) to hold bits 130, 135 in place. Alternatively, depression 510 may be a flexible protrusion that works in a similar fashion, where the protrusion compresses on the bit and fits with a void. FIG. 6 shows a perspective view of an embodiment of a ratcheting multitool. FIG. 7 shows a left side view of the ratcheting multitool of FIG. 6. FIG. 8 shows a right side view of the ratcheting multitool of FIG. 6. FIG. 9 shows a top view of the ratcheting multitool of FIG. 6. FIG. 10 shows a bottom view of the ratcheting multitool of Fig. FIG. 11 shows a front view of the ratcheting multitool of FIG. 6. FIG. 12 shows a back view of the ratcheting multitool of FIG. 6.

In many variations, alternative bits may be used, including those that perform the functions of wrenches, hex wrenches, screwdrivers, and other tool ends. Any bit or attachment that it is useful to have ratchet and provide leverage to may be included as a bit. Additionally, alternatives to the other cut outs and features on the Ratchet Multitool 100 may be included. In many embodiments, the principle of operation includes the inclusion of a ratchet and a bit storage area inside of the ratchet. The bit storage area rotates such that it can be in line with the body in a storage position and therefore having a low profile. The bit storage area rotates such that it and the bits contained therein may be removed. The bit storage area rotates into a void or aperture. The void or aperture is shaped such that it can accommodate the bits and the bit storage area (or tool holder or bit holder) and hold them in place, so that the bits may not easily be removed without rotation. This in many embodiments is accomplished via the internal edge of the body portion where the frame has been cut out. When the bit holder is turned in, the bits cannot slide in and out of the sleeve provided by the bit holder. This is because the inner edge of the body that forms the cut out prevents this. Additionally, in many configurations, the body portion is formed from a piece of printed material, typically aluminum, however, various metals, plastics, woods, or composites, or other materials may be used. In many embodiments, the bit storage area is formed of plastic, however, various metals, plastics, woods, or composites, or other materials may be used.

While specific embodiments have been described in detail in the foregoing detailed description, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein but is intended to cover modifications within the spirit and scope thereof as defined by the appended claims and any and all equivalents thereof.

What is claimed as new and desired to be protected by Letters Patent of the United States is:

1. A ratchet keychain attachment comprising:

a body;

a ratcheting area in the body;

a bit holder, wherein the body is a piece of printed material, the piece of printed material having a bit holder aperture in a center of the body, the bit holder pivotally mounted in the bit holder aperture, the bit holder aperture having a continuous interior perimeter;

a bit, removably located in the bit holder, the bit holder having a first position where the bit is held in a non-removable position in a storage position in the bit holder, the bit holder inside the body in the bit holder aperture and positioned to rotate in line with the body in the non-removable position such that a first longest dimension of the bit is in line with a second longest dimension of the body, and a second position where the bit is in a removable position, wherein an internal edge of the body in the bit holder aperture holds the bit in place in the first position and the bit holder is squared off to interfere with the bit holder aperture as it rotates in that a width of an area on the bit holder is slightly wider than a space in the bit holder aperture causing the area to press against the interior perimeter causing an interference in the second position.

2. The ratchet keychain attachment of claim 1, wherein the ratcheting area includes a bit receiving area, the bit receiving area shaped to receive and hold the bit in an operable position.

3. The ratchet keychain attachmentof claim 2, wherein the bit holder includes a bit holder body that has a second aperture for receiving the bit.

4. The ratchet keychain attachment of claim 3, wherein the second aperture has a sleeve shape.

5. The ratchet keychain attachment of claim 4, wherein when the bit holder is in the second position, the bit can be slid in and out of the sleeve shape.

6. The ratchet keychain attachment of claim 5, wherein when the bit holder is in the first position, the edge of the body prevents the bit from being slid in and out of the sleeve shape.

7. The ratchet keychain attachment of claim 6, wherein the body includes a carabiner portion.

8. The ratchet keychain attachment of claim 7, wherein the body further includes a bottle opener, a cutting area, and a wrench area.

9. The ratchet keychain attachment of claim 2, wherein the bit receiving area only ratchets in one rotational direction.

10. The ratchet keychain attachment of claim 9, wherein the bit receiving area includes a first side and a second side and the bit receiving area receives the bit on either of the first side or the second side.

11. The ratchet keychain attachment of claim 10, wherein the bit holder is held in the first position via an interference fit with the edge of the body.

12. The ratchet keychain attachment of claim 11, wherein the interference fit occurs due to a shape of the bit holder and the first aperture.

13. A ratchet carabiner comprising:

a body;

a bit holder, wherein the body is a piece of printed material, the piece of printed material having a bit holder aperture in a center of the body, the bit holder pivotally mounted in the bit holder aperture, the bit holder aperture having a continuous interior perimeter;

a bit, removably located in the bit holder, the bit holder having a first position where the bit is held in a non-removable position in the bit holder, the bit holder inside the body in the bit holder aperture and positioned to rotate in line with the body in the non-removable position such that the bit is in line with the body, and a second position where the bit is in a removable position, wherein an inner edge of the body that forms the bit holder aperture holds the bit in place in the first position, wherein the bit holder is squared off to interfere with the bit holder aperture as it rotates in that a width of an area on the bit holder is slightly wider than a space in the bit holder aperture causing the area to press against the interior perimeter causing an interference in the position.

14. The ratchet carabiner of claim 13, further comprising:

a ratcheting area in the body.

15. The ratchet carabiner of claim 14, wherein the ratcheting area includes a bit receiving area, the bit receiving area shaped to receive and hold the bit in an operable position and includes a first aperture, the bit holder located in a second aperture, an edge of the body defining the second aperture preventing the bit from being removed from the bit holder when the bit holder is in the first position.

16. A method of using a ratchet carabiner, the method comprising:

providing a ratchet carabiner, the ratchet carabiner including a body;

a ratcheting area in the body;

a bit holder, wherein the body is a piece of printed material, the piece of printed material having a bit holder aperture in a center of the body, the bit holder pivotally mounted in the bit holder aperture, the bit holder aperture having a continuous interior perimeter;

a bit, removably located in the bit holder, the bit holder having a first position where the bit is held in a non-removable position in the bit holder, the bit holder inside the body in the bit holder aperture and positioned to rotate in line with the body in the non-removable position such that the bit is in line with the body, and a second position where the bit is in a removable position, wherein an internal edge of the body in the bit holder aperture holds the bit in place in the first position and the bit holder is squared off to interfere with the bit holder aperture as it rotates in that a width of an area on the bit holder is slightly wider than a space in the bit holder aperture causing the area to press against the interior perimeter causing an interference in the second position;

rotating the bit holder to the second position;

removing the bit;

inserting the bit in the ratcheting area;

ratcheting with the ratcheting carabiner.

17. The method of claim 16, wherein the ratcheting carabiner includes a carabiner section on the body, and further comprising:

removing the ratcheting carabiner from a key chain via the carabiner section.

18. The ratchet keychain attachment of claim 1, wherein a bit storage area includes a wider portion and a narrower portion and a diagonal interface between the wider portion and the narrower portion, such that the diagonal interface holds the bit storage area in portion in the bit holder aperture.

* * * * *